United States Patent [19]
Humal

[11] Patent Number: 5,858,298
[45] Date of Patent: Jan. 12, 1999

[54] METHOD FOR THE SELECTIVE CLOSING OF THE PORES OF THE SURFACE OF THERMO-PLASTIC POROUS MATERIAL

[76] Inventor: Leo-Henn Humal, Ulikooli tn. 15-4, Tartu EE2400, Estonia

[21] Appl. No.: 875,311

[22] PCT Filed: Jan. 18, 1996

[86] PCT No.: PCT/EE96/00001

§ 371 Date: Jul. 23, 1997

§ 102(e) Date: Jul. 23, 1997

[87] PCT Pub. No.: WO96/22874

PCT Pub. Date: Aug. 1, 1996

[30] Foreign Application Priority Data

Jan. 24, 1995 [EE] Estonia ................ P 95 00001

[51] Int. Cl.$^6$ ............................ B29C 67/20; B29C 71/04
[52] U.S. Cl. ........................................ 264/413; 264/321
[58] Field of Search ........................... 264/321, 413

[56] References Cited

U.S. PATENT DOCUMENTS

| | | | |
|---|---|---|---|
| 3,112,524 | 12/1963 | Legler | 264/321 X |
| 3,386,877 | 6/1968 | Skochdopole et al. | 264/321 X |
| 3,742,853 | 7/1973 | Landsman | 264/321 X |
| 3,816,233 | 6/1974 | Powers | 264/321 X |
| 4,064,205 | 12/1977 | Landsman | 264/321 X |

FOREIGN PATENT DOCUMENTS 673574   4/1966   Belgium .
553808   8/1993   European Pat. Off. .

OTHER PUBLICATIONS

*Konstruktion,* vol. 38, No. 9, Sep. 1986, pp. 347–348.

Fudim, E.V. "Sculpting Parts with Light", *Machine Design,* Mar. 1986, pp. 102–106.

*Primary Examiner*—Leo B. Tentoni
*Attorney, Agent, or Firm*—Titus & McConomy LLP

[57] ABSTRACT

A method for closing of the pores of selected areas of the surface of thermo-plastic porous material (7), comprising heating of selected areas of the surface of the porous material (7) by light radiation. Simultaneously, the surface of the porous material (7) is compressed by a transparent smooth body (11). According to the embodiment (I), the surface of the porous material (7) is scanned over by one of the several focused light beams, that are switched on and off. According to the embodiment (II), between the porous material (6) and the smooth transparent body (11), a transparent means containing a light-absorbing pattern (9) of surface elements with pores being left open is placed, whereas the distance between the light-absorbing surface (10) and the surface (7) of the porous material (6) is at least 0.02 mm, or, according to embodiment (III), it is a means with low light-absorption (14) containing a light-absorbing pattern (15) of the surface elements with pores to be closed, that is in good thermal contact with the surface (7) of the porous material (6), and a light of high intensity is conducted through the transparent smooth body (11).

4 Claims, 9 Drawing Sheets

METHOD FOR THE SELECTIVE CLOSING OF THE PORES OF THE SURFACE OF THERMO-PLASTIC POROUS MATERIAL

TECHNICAL FIELD

The present invention belongs to the sphere of the technology of plastics. A specific application for the thermo-plastic porous material with closed pores on selected areas of its surface is pre-inked stamps, therefore the present invention can also be regarded as relating to the manufacturing of rubber-type stamps and other printing plates. However, the possible application of the invention is not limited to this, because porous materials with pores, closed in selected areas of its surface by quite a simple process, can also find wider application.

BACKGROUND ART

A known method is to close the pores of selected areas of the thermo-plastic porous material by feeding it through heated rollers with engraved pattern(s) as in European Patent No. 0,553,808, or by pressing it with the heated face of a master mould, which has indentations to prevent it from heating and pressing the surface elements with the pores to be left open (GB patent No 1112776, B 44 C 1/24, Bankers and Merchants, Inc., 1968; JP patent No 6024114, B 41 K 1/50, Tokyo Ohka Kogyo Co.,Ltd., 1994). This method is used beside with other applications at the manufacturing of pre-inked stamps to selectively produce on the surface of porous thermo-plastic material a solid film, non-permeable for ink. The method is labour-consuming, as the manufacturing of each stamp of any new typesetting or picture requires the preparation of a new master mould.

Cross-linking and solidifying of molecules of polymer materials with light radiation has been widely used for forming not only printing surfaces but even complex three-dimensional parts of different shapes, but this method is known only for solid, nonporous materials (KONSTRUKTION, vol. 38, no. 9, September 1986, Berlin, pp. 347–48, E. V. Fudium: ("Sculpting Parts with Light")

Another known method is the manufacturing of printing surfaces from porous material with the help of laser radiation, where the surface of porous material in background areas is burnt and evaporated, thus creating the necessary relief (JP patent No 6191002, B 41 C 1/50, Mitsubishi Pencil Co. Ltd., Tsukasa Felt Shoji KK., 1994). A disadvantage of this method is that a sophisticated high-power laser is needed. Another problem is that at the scanning speeds usually accepted, provided the radiant power is sufficient, it is possible to obtain the elimination of a certain layer of the material, but the surface opened under the eliminated layer is not moulded to the depth necessary for closing the pores.

One more method of forming printing surfaces with the use of light radiation is to form on the surface of the porous thermo-plastic material a light-absorbing pattern of non-printing elements and to heat the surface by exposure to infra-red radiation, as in U.S. Pat. No. 4,064,205. The forming of the light absorbing pattern is accomplished by using a temporary cover sheet with a light absorbing coating and by transfer of the coating to selected areas of the printing surface by laser scanning. This method is used to form relief printing plates and is too complicated to use for the production of pre-inked stamps, as it requires the use of a powerful laser scanner.

Among the known technical solutions, the closest to the present invention is a method of manufacturing printing plates by heating the porous thermo-plastic material by light radiation (U.S. Pat. No. 3,742,853, B 41 D 7/00, Perkin-Elmer Corporation, 1973). The surface of porous thermo-plastic material is covered with a reflecting metal film. This film is eliminated by laser radiation in background areas. After the surface has been prepared in such a way, it is heated by intensive infra-red radiation, which makes the areas not screened by the reflective film melt and collapse. To accomplish this method, a laser is needed, powerful enough to evaporate the metal film on the surface when scanning it, and also a source of infra-red radiation. As the method is used for manufacturing of relief printing plates, simultaneously with heating, as a mechanical means, a pressure difference between the upper and lower surfaces of the porous material is applied, using for it, for example, a perforated plate connected to a vacuum system under the lower surface of the porous material. This method does not provide any additional means, applied simultaneously with the heating by light radiation, which would promote the closing of pores.

DISCLOSURE OF INVENTION

It is the object of the present invention to provide a method for the closing of the pores of selected areas of the surface of thermo-plastic porous material through heating the surface by light radiation.

This objective is achieved by compressing the surface of the porous material with a transparent smooth body simultaneously with heating the surface of the porous material by light radiation.

According to embodiment I of this method, the surface of the porous thermo-plastic material, compressed by a smooth transparent body, is scanned over by one or several focused light beam(s), that is/ are switched on at the surface areas with pores to be closed and switched off at the surface areas with pores to be left open, whereas the power of the light beam(s), the scanning speed and the number of repeated scans are chosen so that the heat, produced by radiation and absorbed in the surface, melts the surface of the thermo-plastic material and its pores close.

According to embodiment II of this method, between the smooth transparent body and the porous thermo-plastic material compressed by it, is placed a transparent means containing a light-absorbing pattern of the surface areas with pores to be left open, whereas its light-absorbing surface is at the distance of at least 0.02 mm from the surface of the porous thermoplastic material, and the light of high intensity is conducted through the smooth transparent body, whereby the power density at the surface and the exposition time are chosen so that the light radiation that falls through the transparent means to the surface of the porous thermo-plastic material, heats the surface of the material so that it melts and its pores close, but the heat that has been produced in the light-absorbing pattern, when it reaches to the surface of the porous thermo-plastic material, is not sufficient for the pores to close.

According to embodiment III of this method, between the smooth transparent body and the porous thermo-plastic material compressed by it, is placed a means with low light absorbtion, containing a light-absorbing pattern of the surface areas with pores to be closed, the light-absorbing surface of this pattern being in good thermal contact with the surface of the porous thermo-plastic material, and the light of high intensity is conducted through the smooth transparent body, whereby the power density at the surface and the exposition time are chosen so that the light radiation that is absorbed in the light-absorbing pattern of the transparent means, heats the surface of the porous thermo-plastic material so that it melts and its pores close, but the heat that is produced by the light that falls on the surface areas of the porous thermo-plastic material without the light-absorbing pattern, is not sufficient for the pores to close.

To accomplish these embodiments some special kinds of light sources must be used which produce on the surface of the porous thermo-plastic material the necessary power density and can be switched on and off at short intervals. For this purpose, it is possible to use one or several laser(s) or gas discharge lamp(s) with rare gas filling, together with an adequate control equipment. The light source must generate on the surface areas of the porous thermo-plastic material with the pores to be closed during 0.0005 . . . 2 s continuously or by several shorter impulses the energy density of 0.5 . . . 20 J/cm$^2$.

LISTING OF REFERENCE SIGNS

1—distribution of the rise of temperature at the radiation termination moment

2—maximum rise of temperature as an effect of the radiation impulse of the same duration as in case of curve 1

3—rise of temperature in the material as the effect of a single light impulse

4—rise of temperature as the effect of heat accumulated in the material during the series of light impulses 5—temperature distribution at the end of the following single impulse as the sum of curves 3 and 4

6—porous thermo-plastic material

7—surface of the porous thermo-plastic material 6

8—transparent means

9—light-absorbing pattern of surface elements with pores to be left open

10—light-absorbing surface of the pattern 9

11—smooth transparent body

12—temperature distribution for the areas with light absorbing pattern 9

13—temperature distribution for the areas without light absorbing pattern 9

14—means with low light absorption

15—light- absorbing pattern of surface elements to be closed

16—temperature distribution for the areas with the light-absorbing pattern 15

17—temperature distribution for the areas without the light-absorbing pattern 15

18—base frame

19—electro-mechanical drive of slider

20—electro-mechanical drive of reflecting prism

21—electro-mechanical drive of lasers' case

22—slider

23—frame of the slider

24—reflecting prism

25—case of the lasers

26—row of semiconductor lasers 27, 28—rows of cylindrical lenses

29—row of spherical lenses

30—hollow glass cylinder

31—pressing roller

32—the means 8 or 14 for embodiment II or III, respectively

33—tubular gas discharge lamp

34—pressing plate

35—light source

36—reflectors $T_m$—melting point of the thermo-plastic material $T_a$—the ambient temperature L—light of high intensity M—melted zone B—laser beams

THEORETICAL BASIS OF THE INVENTION

Heat transfer in a homogeneous body via thermoconductivity depends on three parameters, characteristic of the body: thermoconductivity $\lambda$, specific heat c and density $\rho$. A derived parameter $a=\lambda/c\rho$ called temperature conductivity is also used (Lykov. Teoriya teploprovodnosti. Vyshaya Shkola, Moscow, 1967).

Figure 1:
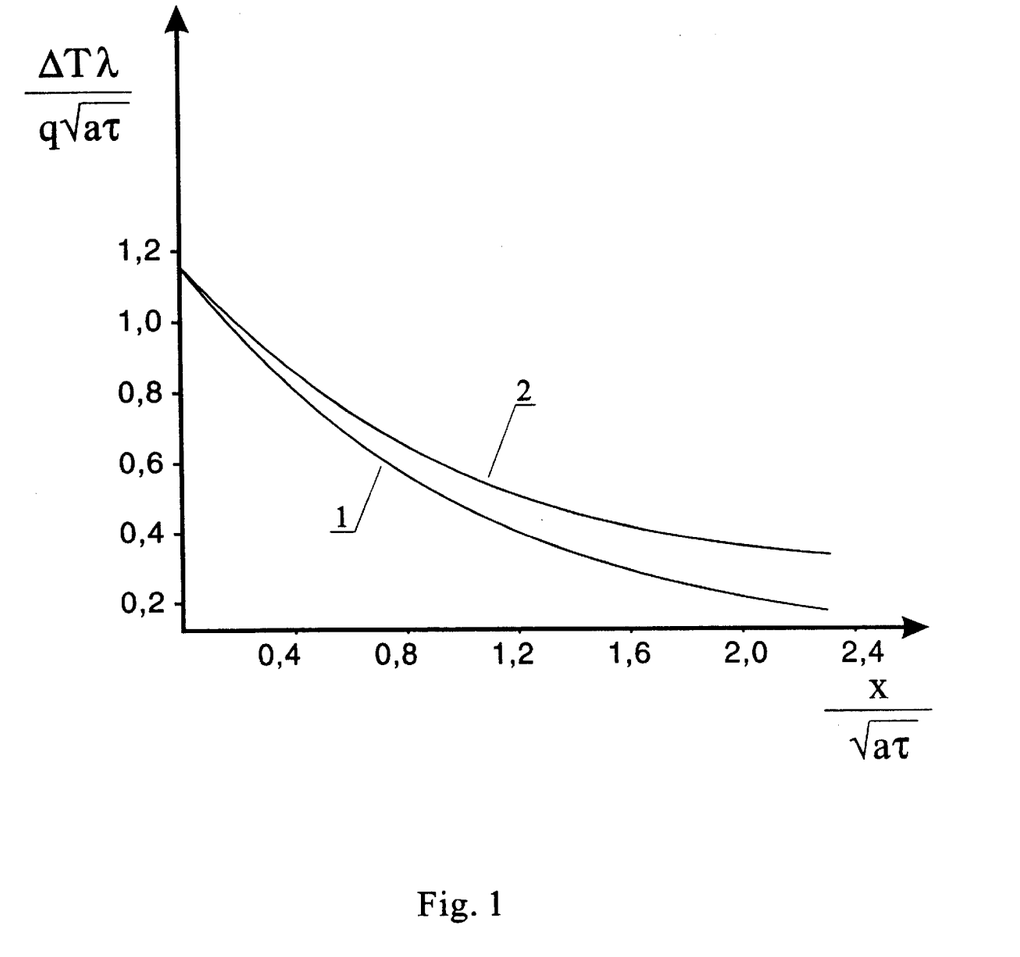
FIG. 1—distribution of temperature inside a homogeneous body, when its surface is irradiated by the light of constant power density FIG. 2—distribution of temperature inside a homogeneous body, when its surface is irradiated by a series of short light impulses FIG. 3—distribution of temperature at the light-absorbing pattern and outside of it according to embodiment II FIG. 4 and FIG. 5—distribution of temperature at the light-absorbing pattern and outside of it according to embodiment III FIG. 6—equipment for realisation of the embodiment I, longitudinal view of the equipment together with a schematic path of light beams FIG. 7—transverse view of the equipment FIG. 8—equipment for realisation of the embodiment II or III—the first version FIG. 9—equipment for realisation of the embodiment II or III—the second version

FIG. 1 presents the distribution of temperature in a homogeneous body, starting from the surface, in the direction perpendicular to the surface, when the surface is irradiated by the light of constant power density during a certain period. Curve 1 presents the distribution of the temperature rise at the radiation termination moment, and curve 2—the maximum rise of temperature as an effect of the radiation impulse of the same duration as in case of curve 1. The shape of these curves does not depend on the power density of radiation, the duration of impulse or the thermal parameters characterising the body: these variables influence only the scale. On the abscissa, the scale unit is chosen as $x/(a\tau)^{1/2}$, on the ordinate—$\Delta T\lambda/q(a\tau)^{1/2}$, where x is the depth from the surface of the material, $\tau$—duration of the impulse, $\Delta T$—rise of temperature and q—power density of the radiation falling onto the surface. The scale on the ordinate demonstrates that the rise of temperature both on the surface and at any depth is proportional to the power density of the radiation and to the square root of the duration of the radiation impulse. The scale on the abscissa demonstrates that if we characterise the depth of heat penetration by the thickness of the layer, during which the rise of temperature decreases by not more than up to a certain part compared to its value at the surface (for example, 0.4), then this thickness will be proportional to the square root of the product of the duration of the radiation impulse and the temperature conductivity of the body. If we choose certain limits for the temperature rise that will give us the layer of the melted material with pores closed (from 80 to 200 centigrade, for example), we can calculate for any given duration of the radiation impulse the power density that generates on the surface the maximal allowed rise of temperature, and the resulting thickness of the melted layer ($x_s$). If a=0.16 m$^2$/s and λ=0.32 W/m·centigrade (the values typical for polyethylene) and choosing the above-mentioned rise of temperature (from 80 to 200 centigrade), the results will be as follows:

| T, ms | q, W/cm$^2$ | $x_s$, mm | E, J/cm$^2$ |
|---|---|---|---|
| 0,01 | 4500 | 0,001 | 0,05 |
| 0,1 | 1400 | 0,004 | 0,14 |
| 1 | 450 | 0,012 | 0,45 |
| 10 | 140 | 0,04 | 1,4 |
| 100 | 45 | 0,12 | 4,5 |
| 1000 | 14 | 0,4 | 14 |
| 10000 | 4,5 | 1,2 | 45 |

To totally close the pores of the porous thermo-plastic material, the thickness of the melted layer should be at least about the maximum diameter of the pores. For example, for manufacturing pre-inked stamps, porous material with about 10 ... 30 μm pores is used. On the other hand, as heat transfers in porous thermo-plastic material not only into its depth, but also parallel to the surface, the areas with closed pores increase about by the thickness of the melted layer, which impairs the accuracy of reproducing the pattern. Therefore, we can assume that the thickness of the melted layer should be between 0.01 ... 0.5 mm. This corresponds to the duration of the radiation impulse between 0.5 ms ... 2 s, the most adequate being in the range of 10 ... 100 ms.

BEST MODE FOR CARRYING OUT THE INVENTION

Figure 2:
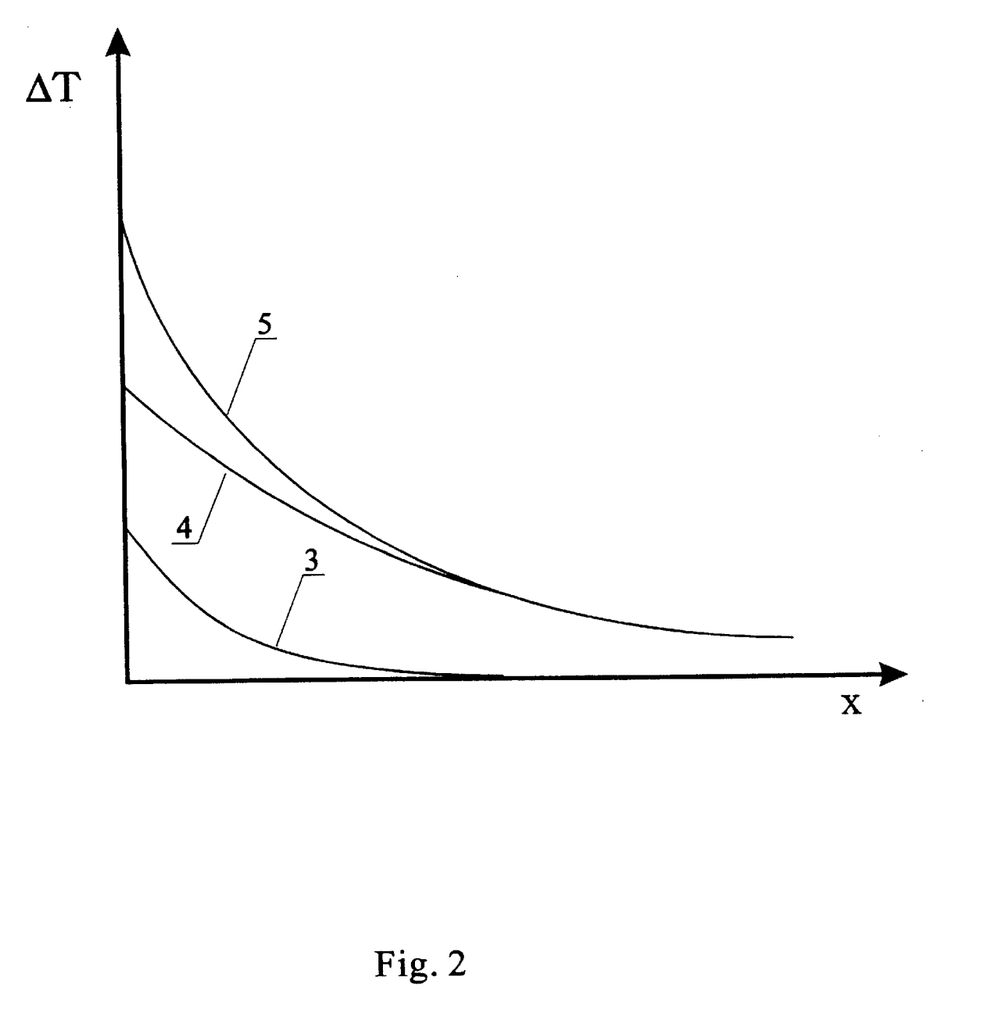

First, we would like to dwell upon embodiment I. Choosing the exposition duration for any surface element of the porous thermo-plastic material compressed by a smooth transparent body to be 10 ms, we get according to the above-given example the necessary power density of 140 W/cm$^2$; if the dimensions of the focused light beam are 50 by 50 μm, it results in the power of radiation of only 3.5 mW. Exposing every surface element during 10 ms and taking the minimal necessary resolution to be 120 lines/cm (300 lines per inch), it is possible to close the pores on 360,000 surface elements per hour, which is extremely low productivity. To increase the productivity, the present invention proposes to use several light beams that are switched on and off independently, and a repeated exposition with several shorter light impulses by multiple scan. The rise of productivity when using several light beams does not need further explanation. The result of repeated exposition with several shorter light impulses by multiple scan is explained referring to FIG. 2, where ΔT is the rise of temperature and x—the distance from the surface. In the case of relatively rare light impulses, the process of heat transfer can be considered as a sum of two parts. Curve 3 describes the rise of temperature in the material as the effect of a single light impulse, curve 4 describes the rise of temperature as the effect of heat, accumulated in the material during the series of light impulses, and curve 5 shows temperature distribution at the end of the following single impulse as the sum of curves 3 and 4. The maximum rise of temperature in the porous thermo-plastic material is equal to the sum of temperature rises caused by both processes. Taking for the initial point the example above, where during 10 ms the surface of the thermo-plastic material is irradiated by the power density of 140 W/cm$^2$, which produces a melted layer of 0.04 mm, let us try to obtain the same thickness exposing the material to several shorter light impulses. As the whole tolerable rise of temperature on the surface of the porous material is divided between the processes described respectively by curves 3 and 4 of FIG. 2, the range of curve 4 in the temperature scale should be less. To retain the given thickness of the melted layer, the total exposition time should be increased. Choosing the maximum rise of temperature according to curve 4 to be 140 centigrade, we will have for the melted layer of 0.04 mm the exposition time of about 20 ms and the energy density of about 1.4 J/cm$^2$. Every single impulse will be allowed to heat up the surface by 60 centigrade according to curve 3. Choosing now the duration of the impulses to be 0.01 ms, the power density of 1400 W/cm$^2$ will be acceptable and the energy density for every single impulse will be 0.014 J/cm$^2$. The necessary total energy of 1.4 J/cm$^2$ will grant a hundred impulses of 0.01 ms, that fill only ½₀ of the total exposition time –20 ms. Consequently, by repeated scanning we will be able to expose during 20 ms twenty surface elements, not two as in the first example. As the necessary power density will be 1400 W/cm$^2$, the required power of radiation will increase up to 35 mW, which is still easy to realise. Obviously, if we use several beams as well as multiple scan, we can quite considerably increase the productivity of closing of the pores of selected areas of the surface of the porous thermo-plastic material.

Figure 3:
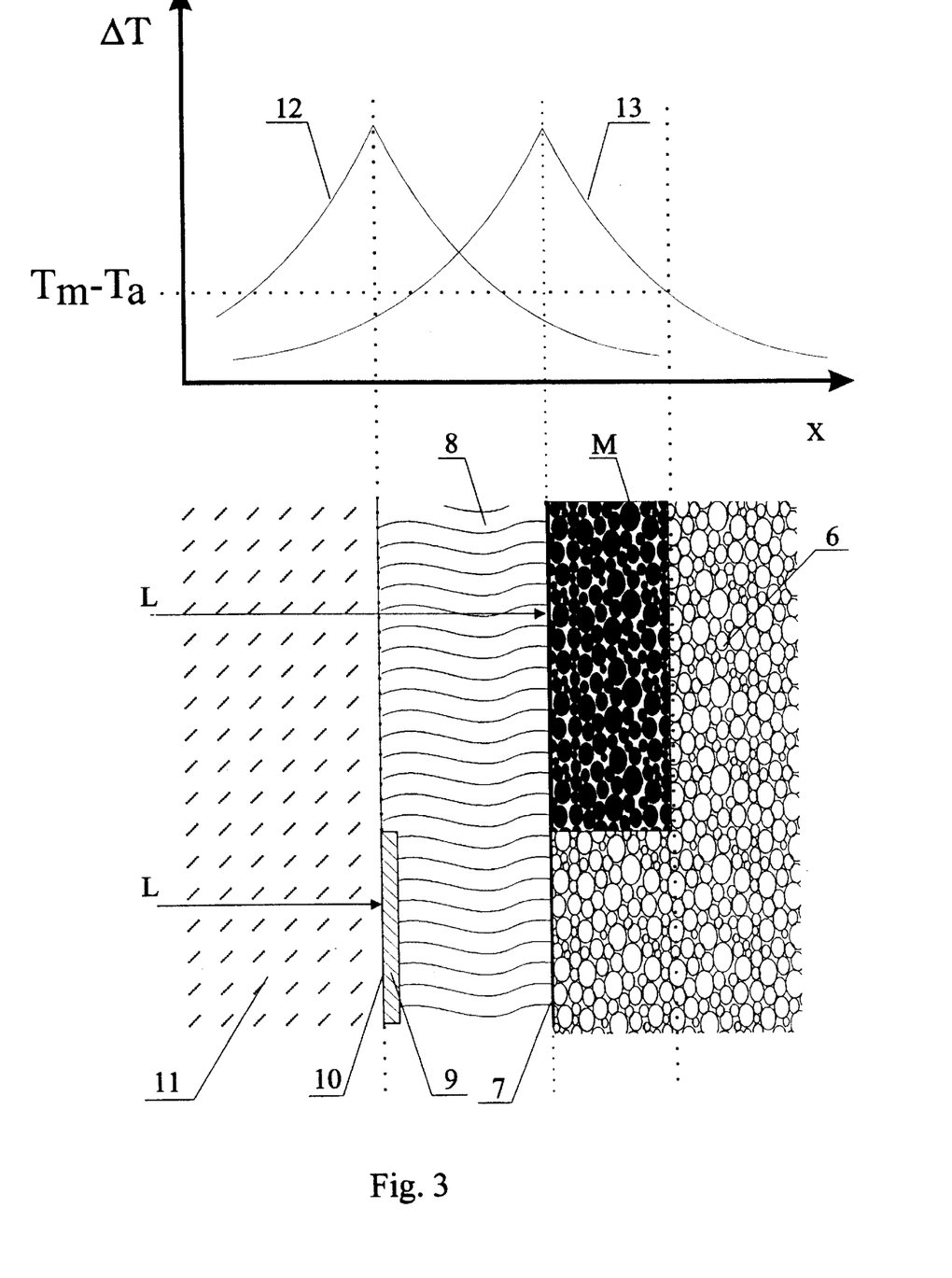

Let us now discuss embodiment II. According to FIG. 3, we have a porous thermo-plastic material 6 with its surface 7. The transparent means 8 containing the light-absorbing pattern 9 of surface elements with pores to be left open, is placed onto the surface of the porous thermo-plastic material, whereas the light-absorbing surface 10 of the aforementioned pattern is at the distance of at least 0.02 mm from the surface of the porous thermo-plastic material. The transparent means 8 is pressed by the smooth transparent body 11 against the surface 7 of the porous thermo-plastic material 6. If the porous thermo-plastic material itself does not sufficiently absorb the light of the used wavelength, its surface 7 or the surface of the transparent means 8 that is in contact with it, can be made light-absorbent. Now the light of high intensity L is conducted through the smooth transparent body 11 in such a way that it falls onto the surface 7 of the porous material 6 covered by the transparent means 8. The energy of this light generates heat at the places where it is absorbed. This heat is generated at the light-absorbing surface 10 of the light-absorbing pattern, in the areas where it is present, or at the surface of the porous material 7 (directly or on the surface of the transparent means 8 in contact with it) in the areas where the light-absorbing pattern 9 is missing, and transfers bidirectionally into both contacting bodies. On the contacting surface the temperatures of both materials are equal, and the absorbed energy is divided between the bodies depending on their thermoconductivity, specific heat and density. This provides temperature distribution for the areas with light absorbing pattern 9 according to curve 12, and for the areas without light absorbing pattern as shown by curve 13. As we can see the maximum temperature rise ΔT exceeds the interval $T_m$-$T_a$ from the ambient temperature $T_a$ to melting point $T_m$ of the porous thermo-plastic material both at the areas with the light absorbing pattern 9 and without it, but in the areas with the light absorbing pattern 9 the temperature distribution differs in such a way that the porous thermo-plastic material 6 is not heated above its melting point $T_m$. As a result, melted zones M are formed at the areas without light absorbing pattern 9. Therefore, FIG. 3 illustrates the main principle on which embodiment II of this invention is based: when heated with a short light impulse of adequate power density, the heat penetration into the depth of the light-absorbing surface is so limited that a light-absorbing pattern at the distance of at least 0.02 mm from the surface of the porous thermoplastic material is sufficient to protect the surface from closing of pores where the open pores are needed.

Figure 4:
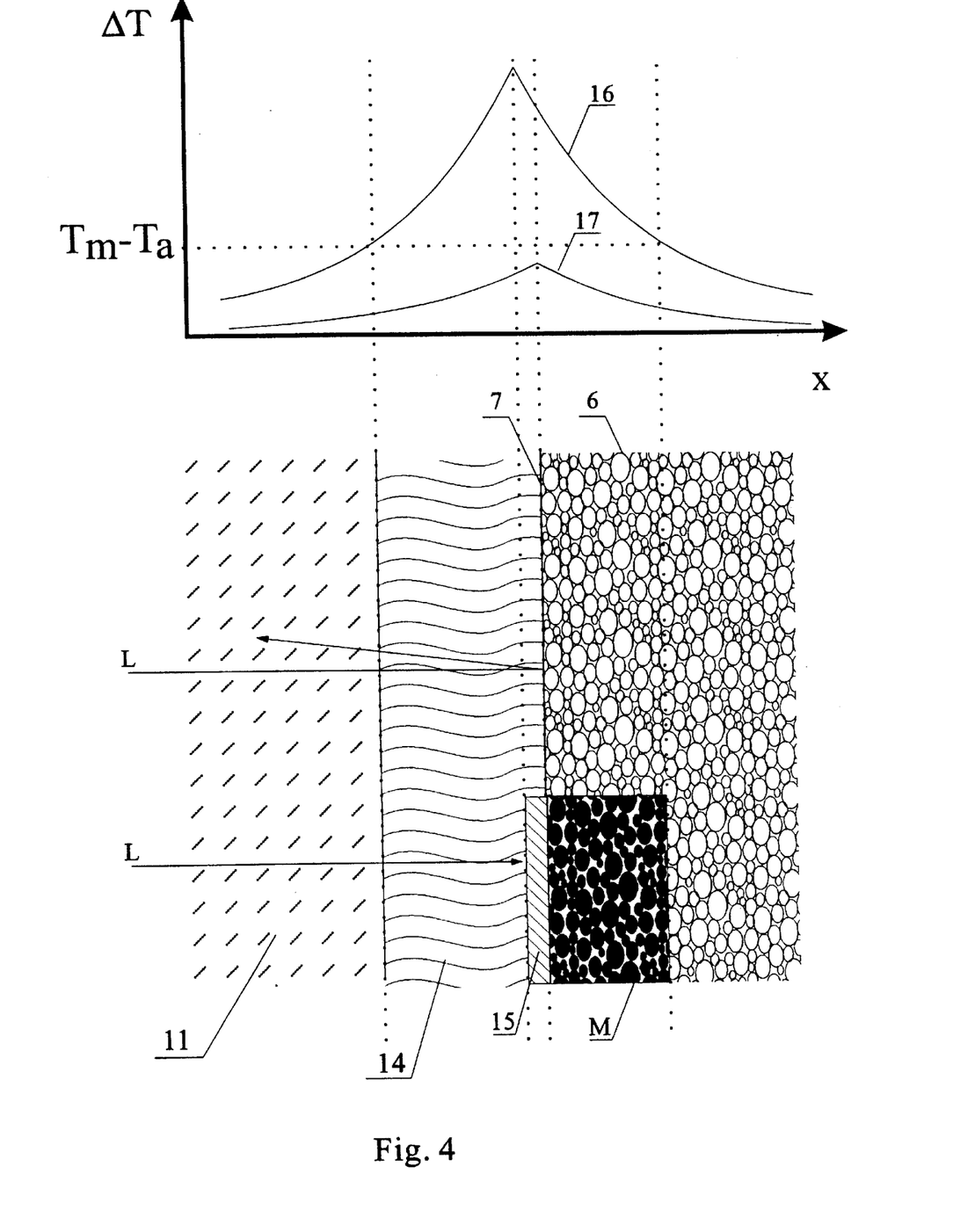
Figure 5:
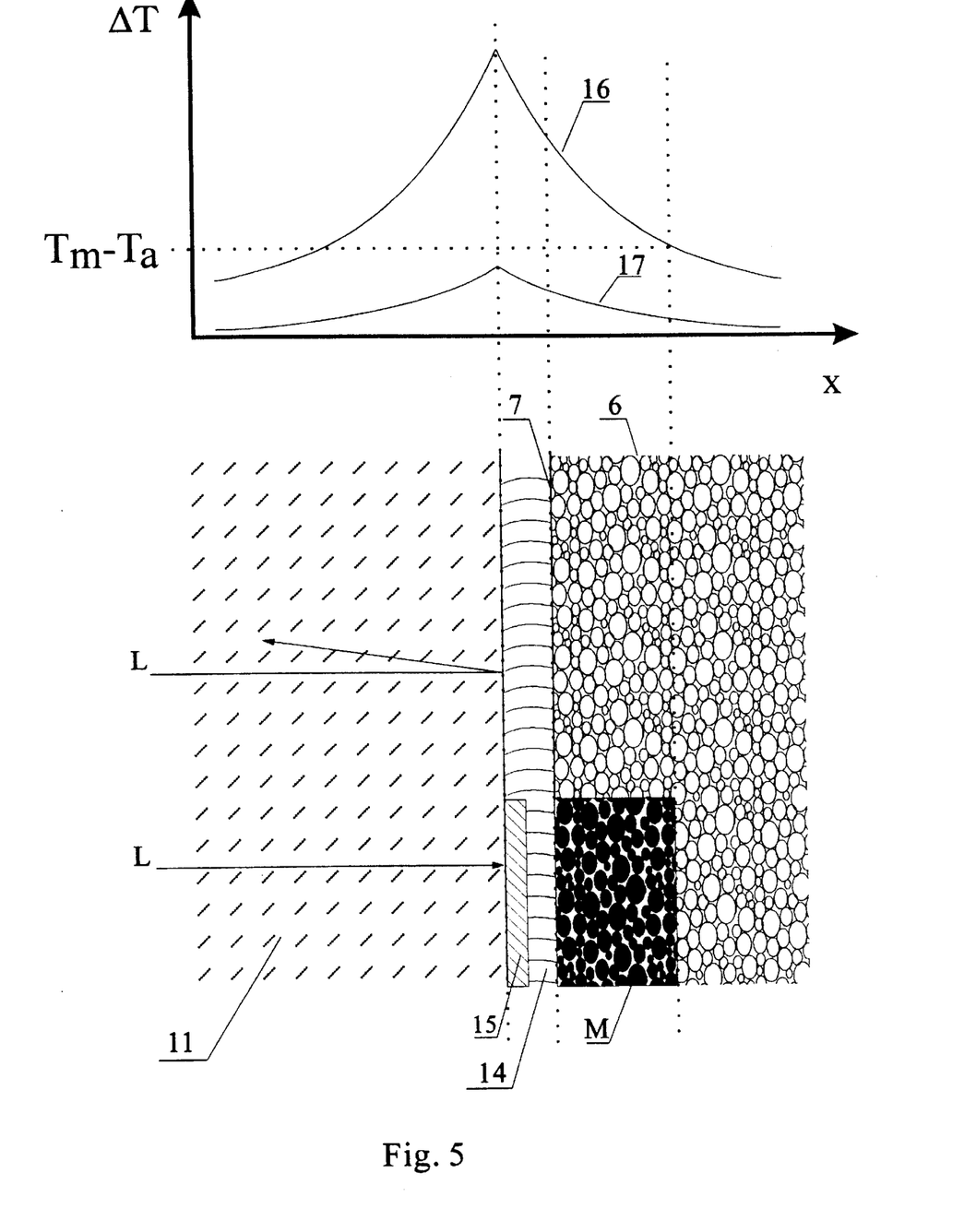

Finally, let us discuss embodiment III. According to FIG. 4, we have the porous thermo-plastic material 6 with its surface 7. The means with low light absorption 14, containing the light-absorbing pattern 15 of surface elements to be closed, is placed onto the surface of the porous thermoplastic material and pressed against it by a smooth transparent body 11. The means with low light absorption 14 can be a transparent or a reflecting means; if it is non-transparent, the light-absorbing pattern 15 must be on the side, adjacent to the smooth transparent body 11 (FIG. 5). Whether the light-absorbing pattern 15 lies on either side of the means 14 with low light absorption, it must be in good thermal contact with the surface 7 of the porous material 6. If the pattern 15 lies on the side of the transparent body 11, good thermal contact can be obtained by small thickness and/or high thermoconductivity of the means with low light absorption. The light of high intensity L is conducted through the smooth transparent body 11 in such a way that it falls onto the surface 7 of the porous material 6, covered by the means 14. From the energy of this light, heat is generated in the light-absorbing pattern 15, in the areas where it is present, and the surface 7 of the porous material 6 is heated. As a result, it melts and its pores are closed. In the areas where the light-absorbing pattern 15 is missing, light is reflected back, heat generation is much lower and the pores remain open. We get the temperature distribution for the areas with the light-absorbing pattern 15 as is shown by curve 16, and for the areas without the light-absorbing pattern as shown by curve 17. Here we see that the maximum temperature rise ΔT exceeds the interval $T_m$-$T_a$ from the ambient temperature $T_a$ to melting point $T_m$ of the porous thermo-plastic material only in the areas with the light absorbing pattern 16. As a result, melted zones M are formed at the areas with light absorbing pattern 15. Consequently, FIG. 4 and FIG. 5 illustrate the main principle on which embodiment III of this invention is based: in the means with low light absorption a pattern with high light absorption can be placed in such a way that, when irradiated by light radiation of adequate power density, the heat transferred from it to the surface of the porous thermoplastic material beneath it is sufficient to melt this surface and close its pores, but the heat generated in the areas without the pattern with high light absorption is not sufficient to melt the surface, thus leaving the pores open.

INDUSTRIAL APPLICABILITY

FIGS. 6, 7, 8 and 9 illustrate the different possible apparatus for accomplishing the method. The apparatus for accomplishing embodiment I, illustrated on FIG. 6 as a longitudinal section together with a schematic path of light beams, and on FIG. 7 as a cross section, consists of a base frame 18 with electro-mechanical drives 19, 20 and 21 attached to it. The drive 19 is connected with a slider 22, on which the porous material 6 to be processed is placed together with the smooth transparent body 11. The slider 22 has a frame 23 on it, that presses the smooth transparent body against the surface 7 of the material 6. The slider 22 can be moved by the drive 19 parallel with the longitudinal axis of the apparatus. The drive 20 is connected with the reflecting prism 24, that has its axle perpendicular to the longitudinal axis of the apparatus. A reflecting prism 24 is rotated on its axle by the drive 20. The drive 21 is connected with the case of lasers 25 that contains a row of semiconductor lasers 26, equipped with cylindrical lenses 27 and 28. The case of lasers can be moved by the drive 21 parallel with its longitudinal axis, which is parallel to the axle of the reflecting prism 24. The laser beams B are conducted to one of the faces of the reflecting prism and focused by cylindrical lenses 27 and 28 in such a way that the images of sources are generated at a certain distance from the face of the reflecting prism 24 on which they fall. Between the reflecting prism 24 and the slider 22, a row of spherical lenses 29 connected with the case of lasers is placed and it is arranged so that the laser beams B reflected by the reflecting prism 24 will focus again on the surface 7 of the porous material 6. The drives 19, 20 and 21 and the lasers 26 are electrically connected to the electronic control device, whereas the drives have been constructed so that they provide the control device with the information about the current position of the nodes that they move.

Figure 6:
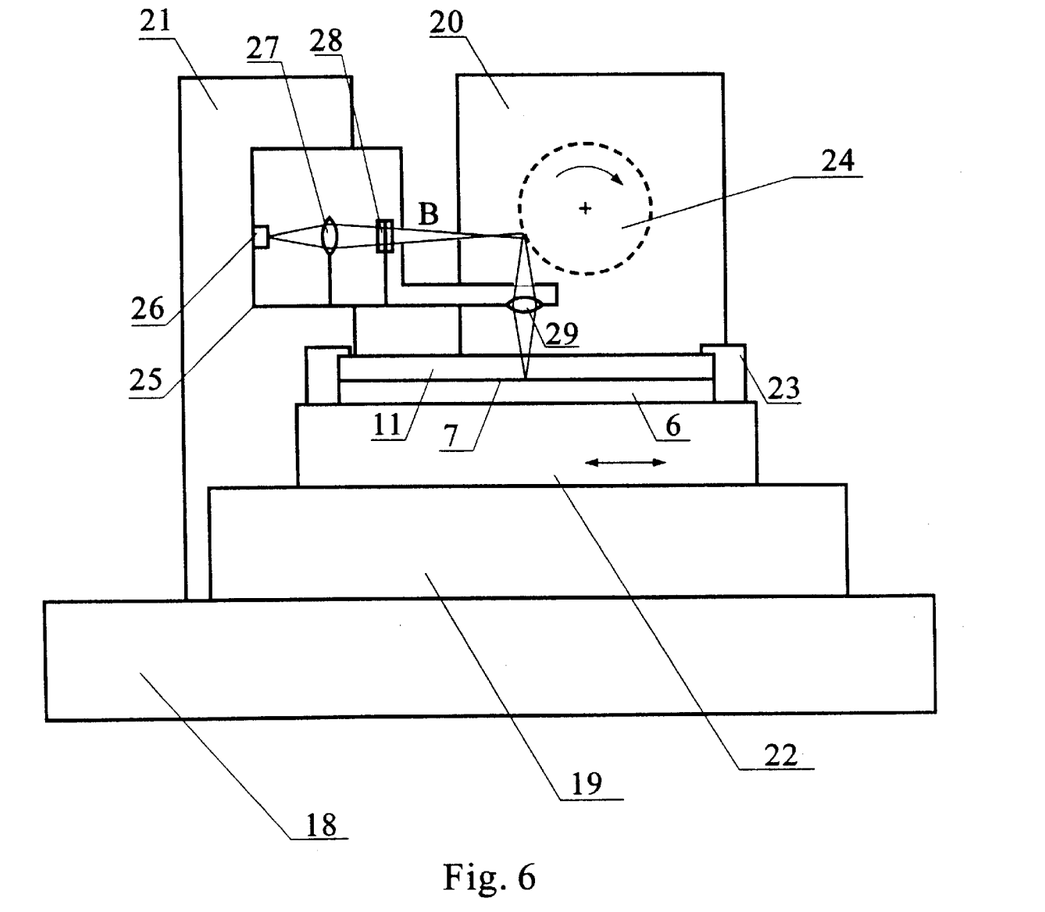
Figure 7:
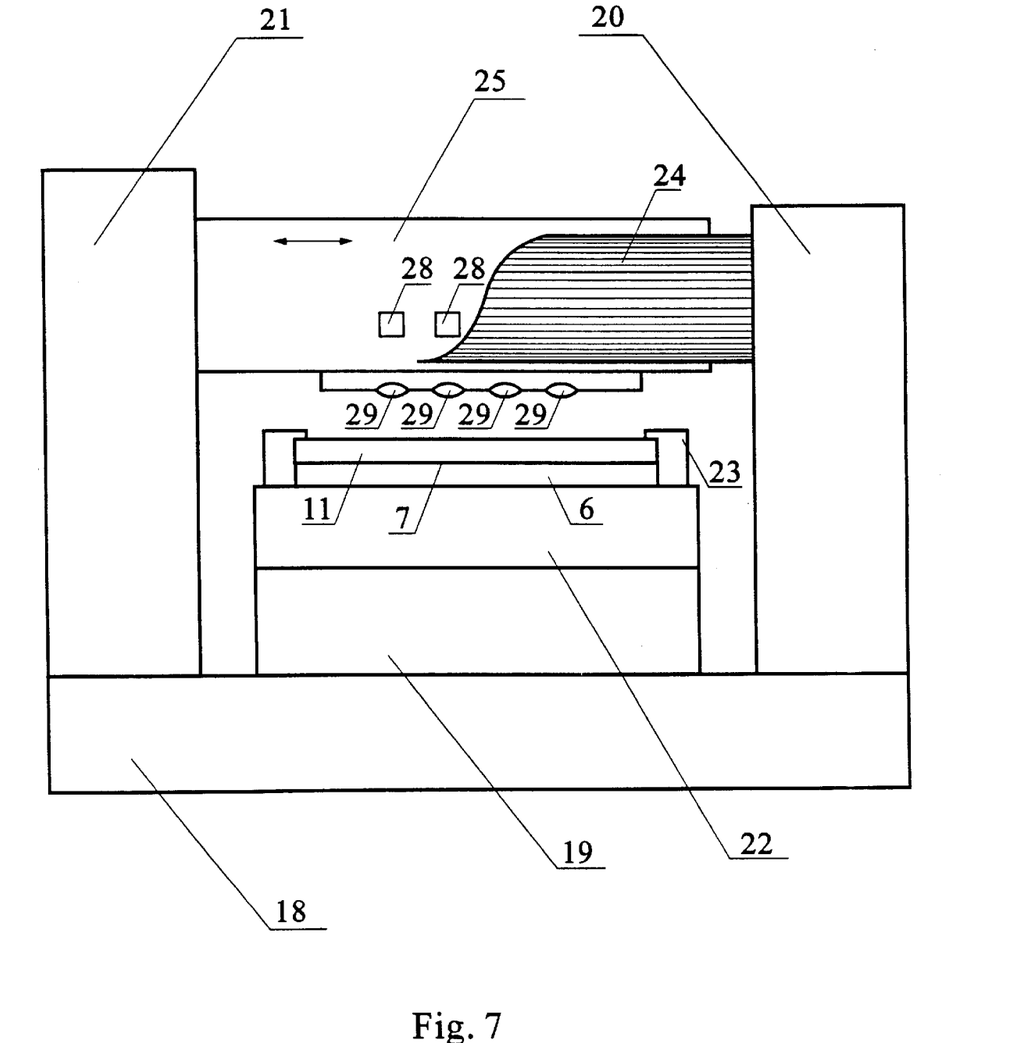

The apparatus functions in the following way. The reflecting prism 24 is rotated by the drive 20 at high speed and each of its faces repeatedly declines the laser beams B by a small angle, and consequently the focused beams on the surface 7 of the porous material 6 are displaced for a small distance longitudinally to the apparatus. The control device is provided with an electronically stored representation of the necessary pattern, containing information for every element of the surface, about whether it must have opened or closed pores. According to this representation and the information from the drives, the control device switches the lasers on and off, generating by multiple scan in the surface of the porous material the temperature distribution corresponding to embodiment I of this invention. When the current set of surface elements, repeatedly scanned over by the beams, declined only by the reflecting prism 24, has gathered the necessary exposition, the case of lasers 25 is moved by the drive 21 for one step transversally to the apparatus, and the next set of surface elements will be exposed. This way successive sets of surface elements are exposed, until an exposed band, extending over the whole width of the material, is created. Then the drive 19 shifts the slider 22 on for the width of this band and the following band is exposed. This process is repeated until the whole surface 7 of the porous material 6 has been exposed.

To get the quantitative parameters for embodiment I corresponding to the example above (multiple scan of 20 elements by 0.01 ms impulses during 20 ms), the reflecting prism should have some 30 . . . 36 faces and rotate at about 10000 r.p.m. Choosing the radiation power of lasers, it must be born in mind that analogically to embodiment II and III, heat energy is divided between the surface of the porous material and the smooth transparent body, therefore, about a half of the total power falling onto the surface is left for the heating of the porous material. A typical semiconductor laser with the radiation power of up to 0.5 W has its source dimensions 1 by 100 μm and a beam divergence of 40 by 10 degrees, so it is not difficult to achieve by an adequate focusing system containing cylindrical lenses, the radiation power of 100 mW on the area of 50 by 50 μm. According to the example above, every laser could process the surface area of 250 cm² per hour, and if the apparatus would have, for example, 8 lasers, the total productivity would be 20 dm² per hour.

Figure 8:
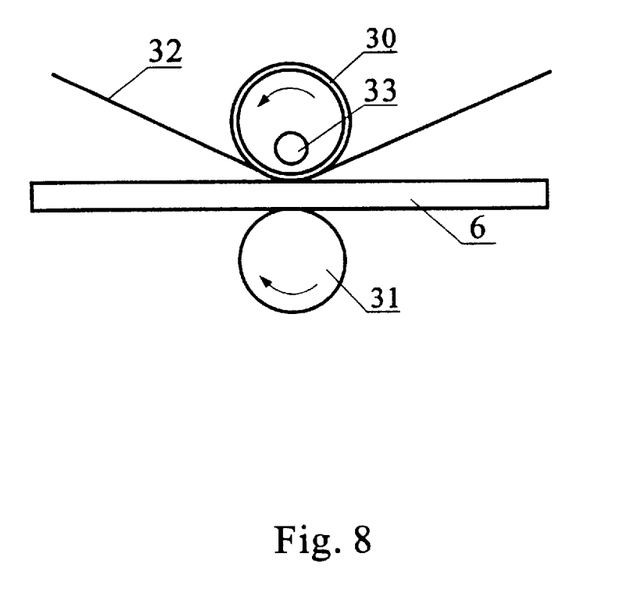

FIG. 8 illustrates the first version of the apparatus for accomplishing of the embodiment II or III of this invention. The apparatus consists of a hollow glass cylinder 30 and a pressing roller 31 parallel to it, both of which are attached in the case of the apparatus in such a way that they can be rotated around their axis by their drive. The cylinder 30 and the roller 31 are arranged at such a close distance that there is space between them for an adequately compressed sheet of the porous thermo-plastic material 6 and the means 32, containing a light- absorbing pattern, the means 32 being transparent or with low light absorption for embodiment II or III, respectively. Inside the hollow glass cylinder 30 a tubular gas discharge lamp 33 is placed. Both the lamp 33 and the drives of the cylinder 30 and the roller 31 are controlled by an electrical control device.

The apparatus functions as follows. The porous thermo-plastic material 6, covered on the side of the cylinder 30 with the means 32, containing a light-absorbing pattern according to embodiment II or III of this invention, are fed by their ends between the cylinder 30 and the roller 31, and the apparatus is started. The cylinder 30 and the roller 31 start rotating at low speed, passing through between themselves the porous material 6 and the means 32. Simultaneously, the control device generates a series of light impulses of adequate power and duration in the gas discharge lamp 33, which expose the surface of the porous thermo-plastic material 6 through the means 32 according to embodiment II or III of this invention.

As was mentioned above, the preferred exposition time is about 10 ms, with the power density of heat, generated in the surface of the porous thermo-plastic material, being about 140 W/cm². Assuming that about half the power is lost in the means with the light-absorbing pattern, pressed against the surface of the porous thermo-plastic material, the power density of about 300 W/cm² will be necessary. Adjusting the tubular gas discharge lamp not too far from the surface to be exposed and using, if necessary, some kind of reflectors, we can obtain this power density if the radiation power of the lamp is some 500 . . . 1000 W per each centimeter of its length, or total 5 . . . 10 kW for a 10-cm-long lamp. As the efficiency of gas discharge lamps is about 50%, we get the electrical power of 10 . . . 20 kW for a 10-cm-lamp. With the impulse duration of 10 ms, the total energy for the impulse will be 100 . . . 200 J, that is not too much for this kind of lamps. If such impulses repeat, for example, twice a minute, the average power will only be 3.5 . . . 7 W, that does not require any special cooling. Taking the band of the porous thermo-plastic material exposed by every single impulse to be 5 mm, the productivity of the apparatus will be 6 dm² per hour. However, with the apparatus illustrated on FIG. 9, it is not difficult to conduct cooling fluid through the cylinder 31, which will make it possible to increase the frequency of light impulses and, consequently, the productivity by some ten or twenty times.

Figure 9:
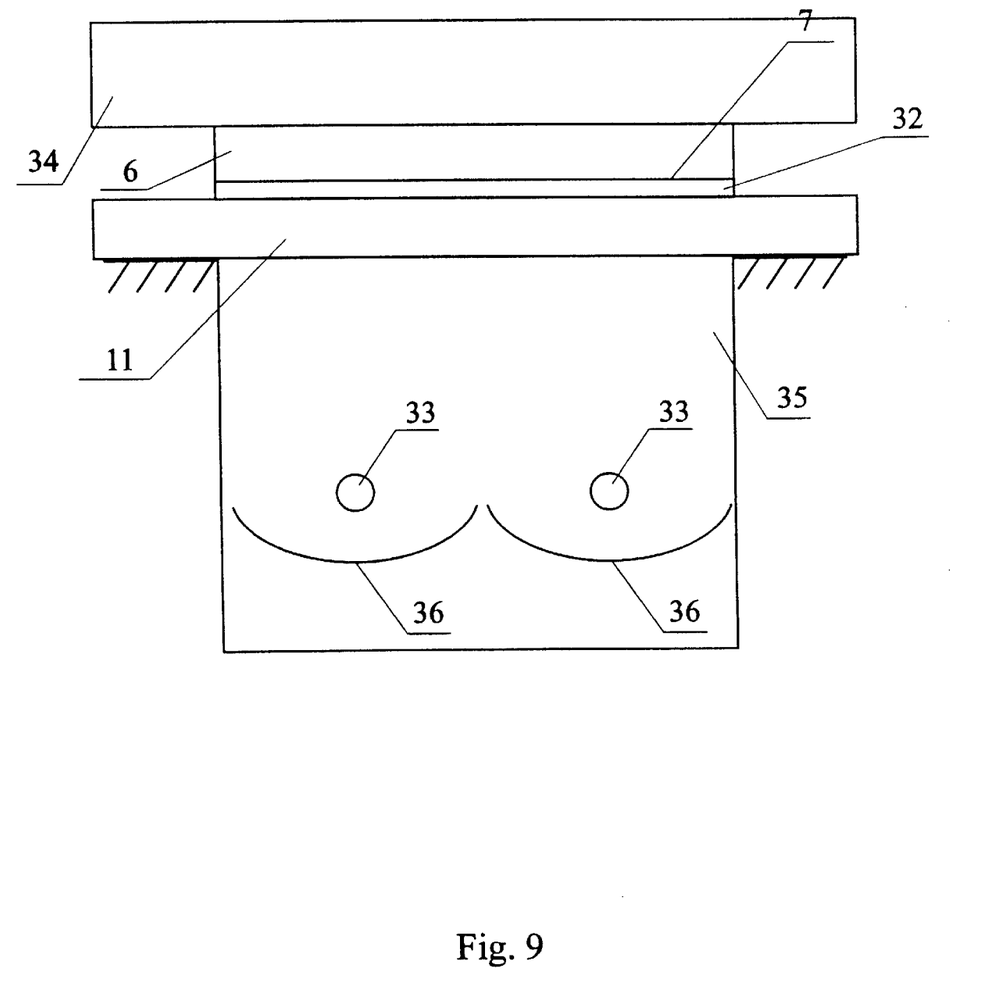

FIG. 9 illustrates the second version of the apparatus for accomplishing the embodiment II or III of this invention. The apparatus consists of a smooth transparent body 11, a pressing plate 34 that is equipped with a pressure mechanism, and a light source 35. As a light source, one or several gas discharge lamp(s) 33 is/are used, and some reflectors 36 can be adjusted to provide uniform light intensity on the surface 7 of the porous thermo-plastic material 6, covered with the light absorbing pattern containing means 32 and placed between the pressing plate 34 and the smooth transparent body 11. The light source is controlled by an electrical control device.

The apparatus functions as follows. Upon the smooth transparent body is placed the light-absorbing pattern containing the means 32 according to embodiment II or III of this invention; the porous thermo-plastic material 6 is placed upon the means 32, and they are pressed by the pressing plate 34 against the smooth transparent body 11. In the light source 35 one or several light impulse(s) is/are generated by the control device that heat(s) the selected areas of surface 7 of the porous thermo-plastic material 6 according to embodiment II or III of this invention.

Choosing the surface to be exposed to be, for example, 1 dm², we will have for the parameters from the example above the necessary heating power of some 30 kW during 10 ms at the surface and the electrical power of some 120 kW. Although this power is considerably high, the necessary energy will be only 1200 J, which is tolerable for adequate gas discharge lamps and can be provided by capacitors of high capacity.

The transparent means 8 for embodiment II or the means with low light absorption 14 for embodiment III, including a light- absorbing pattern, is easy to make, using one or several film(s) and/or paper with the necessary pattern produced on one of them.

I claim:

1. A method for closing pores located in selected areas of the surface of a thermo-plastic porous material, comprising the steps of heating said selected areas by light radiation and compressing said surface using a smooth transparent body simultaneous with said heating.

2. The method according to claim 1, wherein said surface is scanned by at least one focused light beam which is switched on while scanning said selected areas and which is switched off at the areas of said surface with pores to be left open and wherein the power and the scanning speed and the number of repeated scans of said at least one light beam are chosen so that the heat produced by said radiation is absorbed by said surface to melt said surface so that the pressure applied by said smooth transparent body closes pores located in said selected areas of said surface.

3. The method according to claim 1, wherein a transparent means containing a light-absorbing pattern covering areas of said surface having pores to be left open is placed between said smooth transparent body and said porous material such that said light-absorbing pattern is at least 0.02 mm from said surface and wherein light of high intensity is conducted through said smooth transparent body with a power density at said surface and an exposure time chosen so that the areas of said surface not covered by said light-absorbing pattern melt under said exposure so that the pressure applied by said smooth transparent body closes the pores in said uncovered areas of said surface and wherein the light that has been absorbed by said light absorbing pattern is not sufficient to melt the areas of said surface covered by said light absorbing pattern such as to cause the pores located in said covered areas of said surface to close.

4. The method according to claim 1, wherein a means of low light absorption which contains a light-absorbing pattern that covers said selected areas of said surface is placed between said smooth transparent body and said porous material such that said light absorbing pattern is in thermal contact with said surface and wherein light of high intensity is conducted through said smooth transparent body with a power density at said surface and an exposure time chosen so that the areas of said surface covered by said light-absorbing pattern melt under said exposure so that the pressure applied by said smooth transparent body closes the pores in said covered areas of said surface and wherein the light that falls onto the uncovered areas of said surface is not sufficient to cause the pores in said uncovered areas of said surface to close.

* * * * *